March 7, 1961 F. H. GUTH ET AL 2,974,235
POWER GENERATOR CONTROL SYSTEM
Filed Feb. 12, 1957 2 Sheets-Sheet 2
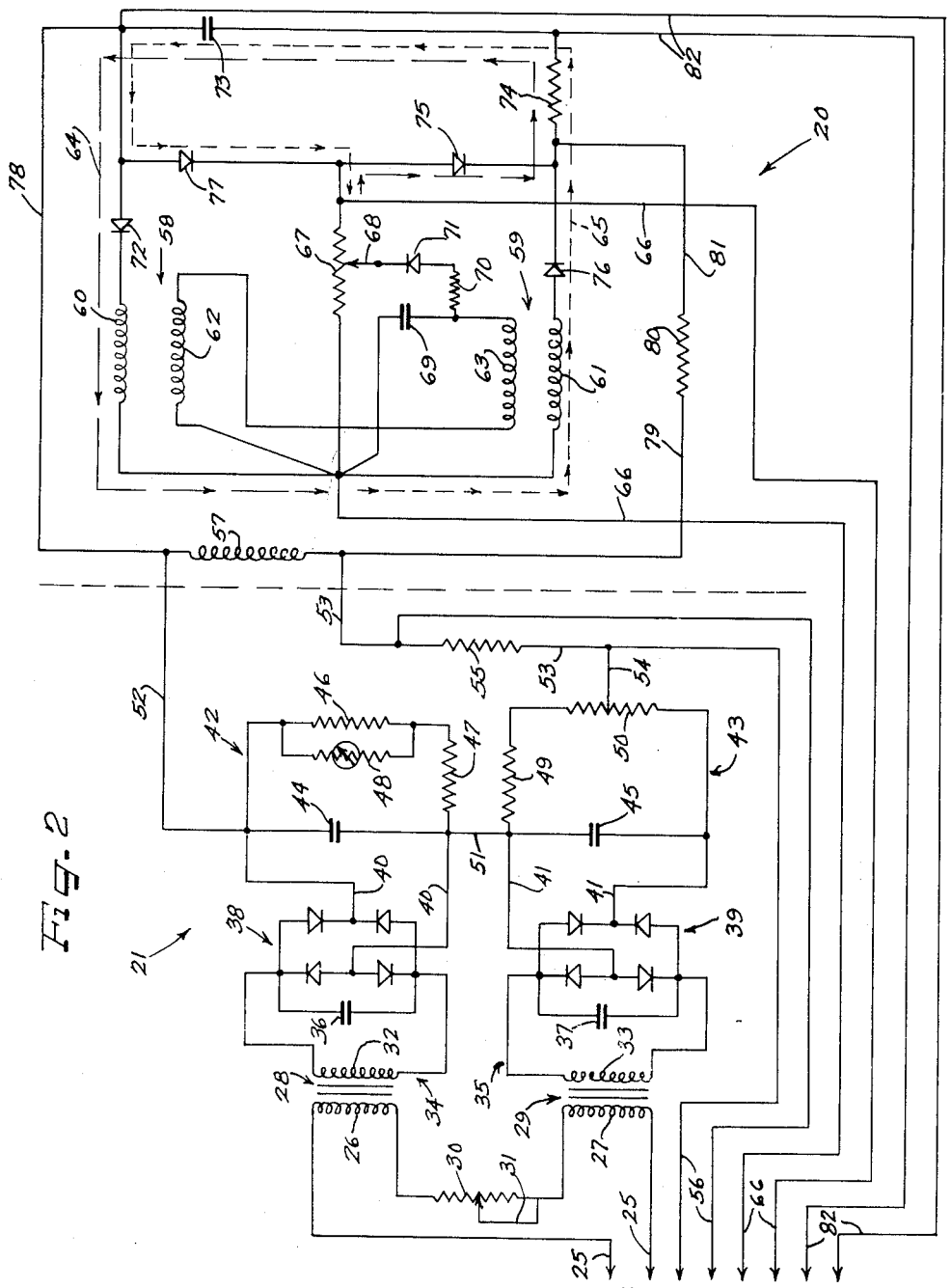
INVENTORS
FRED H. GUTH
JOHN DONALD BLAKE

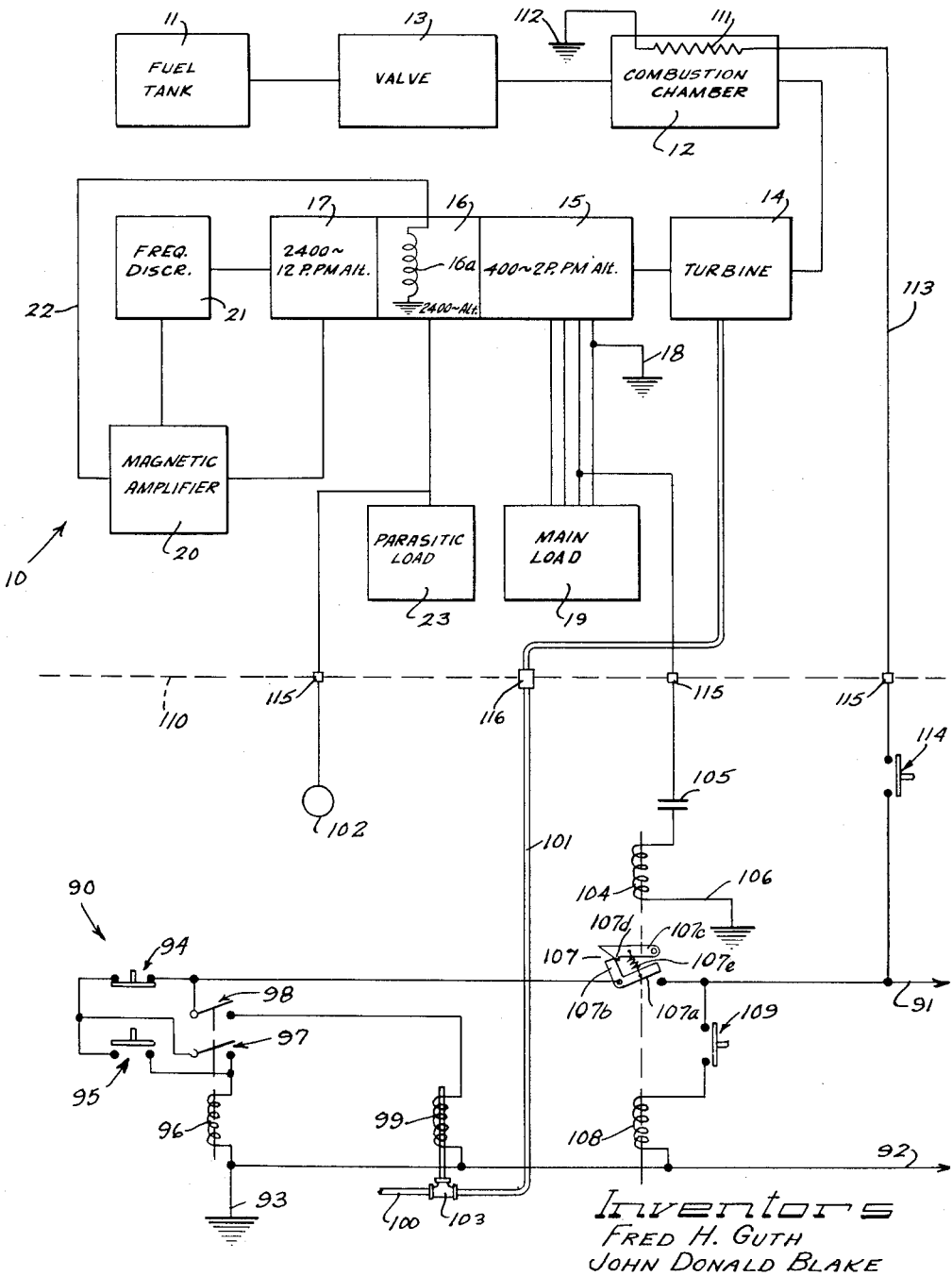

United States Patent Office 2,974,235
Patented Mar. 7, 1961

2,974,235

POWER GENERATOR CONTROL SYSTEM

Fred H. Guth, Warrensville Heights, and John Donald Blake, East Cleveland, Ohio, assignors to Thompson Ramo Wooldridge Inc., a corporation of Ohio Filed Feb. 12, 1957, Ser. No. 639,765

3 Claims. (Cl. 290—40)

The present invention relates to control systems and more particularly to control systems for power generating systems.

In accordance with the principles of the present invention, systems embodying the same may be provided which are operable to control such electrical power generating devices as alternators to maintain the speed thereof, and thereby the frequency thereof substantially constant within very close limits. The basic principle upon which alternator control is effected according to this invention is to control the load on the alternator. By controlling the load on the alternator the torque load on the mechanical system of the alternator and its driver is controlled in such a manner that overspeed of the alternator results in an increased load to thereby slow down the mechanical system whereas underspeed and under frequency of the alternator results in a reduction in the load and thereby an increase in the speed of the alternator back to the predetermined speed and therefore the predetermined frequency.

A preferred form of control system is set forth hereinbelow in great detail and is illustrated in the drawings forming a part of this specification. As a short statement and summary thereof, it should be understood that this preferred embodiment of the invention includes the utilization of a parasitic load for the alternator. The frequency of the alternator is sensed by a frequency discriminator having an output of sign and amplitude dependent upon any error of the alternator's frequency from the predetermined frequency. The output from the frequency discriminator is fed into a magnetic amplifier having an output therefrom supplied to the field windings of the alternator. Thus variations in the frequency of the alternator appear as variations in the field energization for the alternator and these in turn appear as variations in the voltage output of the alternator. By varying the voltage output from the alternator the electrical power consumed in the parasitic load varies to control the reflected torque load on the alternator and its driver and thereby control the speed of the alternator.

A power generating system which may be particularly advantageously controlled by the control system of this invention is one which enjoys particular utility and advantageous operation in such systems as aircraft, especially of the short flight variety, such as rockets and missiles etc. One important system of this type utilizes a monopropellant fuel, an example of which is ethylene oxide, which is fed to a reaction or combustion chamber or gas generator through one or more control valves. The high temperature high pressure expansion gases and products of combustion are then fed to a turbine having a mechanical output coupled either through a gear box or the like or directly to a plurality of alternators that may be driven off the same shaft. In an example of this arrangement one of the alternators is the primary alternator for supplying the electrical power to the primary load such as the electrical instruments and controls etc. of the aircraft. Another of the alternators is a relatively small alternator having its output connected to the parasitic load, and this alternator may for present purposes be termed the parasitic alternator. The third alternator of the group is a small alternator operable to supply current to the control system for controlling the voltage output from the parasitic alternator.

By controlling the voltage output of the parasitic alternator and thereby controlling the electrical load thereon in the manner described hereinabove, and in greater detail hereinbelow, the torque load on the turbine and alternators will control the speed of the alternators.

To initiate operation of the power generating system and to bring the turbine and alternators up to speed extremely quickly, an initial surge of power is provided by a "squib" or a solid self-contained propellant type fuel device which may be contained in the gas generator. This device is to be electrically fired and serves the additional function of providing feedback gas pressure to open the valves and to ignite the monopropellant as it first enters the gas generator. The present invention contemplates including in the control system a control for properly igniting or firing the ignition device or "squib."

Also contemplated within the scope of this invention and the control system thereof is the inclusion in the control system of control circuitry and elements effective for proper ground or dry testing of the alternators, the hereinabove described portions of the control system, and the turbine. This segment of the control system within this invention includes a control circuitry having control functions effective to supply pressurized air to the turbine to run the turbine and the alternators and the above described portions of the control system in the desired manner. This segment of the control system now under discussion and consideration includes electrical circuitry operable from a ground position to start and stop the flow of pneumatic pressure. It also contemplates the inclusion of an overspeed shut-off to shut-down the ground system in the event that air pressure supply should run the turbine at speeds in excess of those which can be corrected by the control system. The invention also contemplates the inclusion of reset means to electrically reset the mechanical overspeed shut-off in the event that such a shut-off has occurred.

From the foregoing it will be observed that there are numerous advantages and features of this invention only some of which have been described hereinabove and others of which will become readily apparent from the following detailed description of the present invention and an embodiment thereof, from the claims, and from the accompanying drawings which form a part of this specification, in which like reference numerals refer to like parts, further in which each and every detail shown is fully and completely disclosed as a part of this specification, and in which:

Figure 1 is a block diagram of the power generating system and parts of the control system and is partly a schematic diagram of other portions of the control system; and Figure 2 is a schematic diagram of the frequency discriminator and magnetic amplifier of the control system of Figure 1.

The power generating system and control system of this invention, as shown partially in block diagram and partially in schematic diagram in Figure 1 is operable as a self-contained power plant. This is highly desirable since the power generating system may be utilized in such installations as aircraft without taking any of the fuel or power supply from the main power plant of the craft. Accordingly, the power generating system of Figure 1, indicated generally at 10, includes its own fuel supply 11. This fuel supply 11 may take the form of a fuel tank carrying a monopropellant such as ethylene oxide, under high pressure.

In operation, the fuel is supplied to a gas generator or reaction chamber or decomposition chamber or burner device 12 through a control valve, or a series thereof, 13 operable to maintain the fuel flow rate from the supply 11 to the gas generator 12 substantially constant. In the gas generator 12 the fuel is decomposed and burned etc. to provide outlet gases at high pressure, high temperature, and high velocity flow rates. The gas so generated is then supplied to a turbine 14 to drive the turbine at high speed, an example of which would be 24,000 r.p.m.

The mechanical rotative drive from the turbine 14 is coupled either directly or through some type of gearing or belting etc., but preferably directly, to a plurality of coaxial common shaft alternators 15, 16 and 17. By preference, the alternators 15, 16 and 17 are respectively a 400 cycle alternator, a 2400 cycle alternator, and a 2400 cycle alternator. The 400 cycle alternator 15 is the alternator which provides the main electrical output from the system and, again by preference, is a three phase Y connected alternator with a grounded neutral, as indicated at 18, for supplying power to the load 19 which may be the instruments and other electrical devices of the craft. One type of alternator which satisfies the foregoing preferences for the alternator 15 is a two pole rotating permanent magnet type alternator. This alternator may then be driven at the turbine speed of 24,000 r.p.m. since no excitation, slip rings, or brushes are required, and since the inherent voltage regulation is quite good. Also, the rotating magnet type alternator results in a reduction of weight and space from other types of alternators.

The 2400 cycle alternator 17 is, in this embodiment of the invention, a single phase 115 volt unit which may also be effective to operate directly driven from the turbine 14 at 24,000 r.p.m. Such a machine may be a 12 pole permanent magnet type machine thereby eliminating any need for a gear box or other speed changing drive between it and the turbine 14 or the 400 cycle alternator 15.

This 2400 cycle alternator 17 is operable to supply power to special loads etc. but an important utilization thereof lies in its connection for supplying power to the magnetic amplifier 20 of the control system and a frequency signal to the frequency discriminator 21 of the control system. While the operation and characteristics and structure of the frequency discriminator 21 and the magnetic amplifier 20 will be explained in great detail hereinbelow, it should be noted now that they are operable in the control system to sense the frequency of the 2400 cycle alternator 17 to determine any error or difference between the frequency of the alternator and the desired 2400 cycles per second therefor and to provide an output, as over line 22 to the third alternator 16, to control a field winding of the alternator 16 for the purposes of controlling the speed and thereby the frequency of all three alternators 15, 16 and 17. The output signal on the line 22 from the magnetic amplifier 20 will then be a direct function of the error between the desired 2400 cycles per second and the actual frequency of the alternator 17. For this purpose the frequency discriminator 21 is effective to sense the frequency of the alternator 17 and provide an output signal having an amplitude and sign which are functions of the magnitude of the error and the direction thereof.

The 2400 cycle alternator 16 in this embodiment of this invention is also operable to be driven on a common shaft with the other alternators 15 and 17 directly from the turbine 14. The energization for the unit comes from the magnetic amplifier 20 which is in turn supplied with power from the alternator 17 and the power demands of the unit are quite small since only a low power field winding 16a is utilized for electrical energization.

The alternator 16 is electrically connected to a load 23 which may be termed a parasitic load which may be a resistor or some other variable power consuming element. By variable it is herein considered that while the resistor may be a fixed resistor the load thereof is variable by varying the voltage supplied thereto and thereby varying the electrical power consumed thereby.

This arrangement provides a most rugged, straightforward, and reliable electrical power supply with optimum performance since the parasitic load is effective to balance the system energy input. By varying the voltage of the output from the alternator 16, the load of the parasitic load unit 23 is varied. This reflects into the unit as a torque load variant with a result in speed change for the unit. As an example, if the unit is overspeeded, the frequency discriminator 21 will provide an appropriate signal to the magnetic amplifier 20 which will in turn increase the potential output from the alternator 16 thereby increasing the power consumed by the parasitic load 23. This increase in power consumed by the parasitic load 23 will be reflected as an increased torque load on the units and on the turbine 14 thereby reducing the speed of the unit and balancing the system energy input from the gas generator 12.

A system of this invention is operable to maintain the desired speed within one-eighth of one percent of the desired speed or within three cycles per second of the 2400 cycle control frequency.

The frequency discriminator 21 and the magnetic amplifier 20 of Figure 1 are illustrated in full schematic detail in Figure 2. Therein it is illustrated that the frequency discriminator 21 receives its power and frequency signal over lines 25—25 from the alternator 17 of Figure 1. This frequency signal and A.C. power are supplied to the primaries 26 and 27 of a pair of transformers 28 and 29 respectively, the primaries 26 and 27 being connected in series through a gain adjustment potentiometer 30 having an arm 31 connected for adjustable shorting of part of the potentiometer whereby the potentiometer will be operable both as the balancing unit and as an input energy level control. The respective secondaries 32 and 33 of the transformers 28 and 29 form the inductances of a pair of tuned tanks indicated generally at 34 and 35, respectively. Within the tuned tanks, each has a capacitor 36, 37 connected across its respective secondary 32, 33.

In order to effect a frequency deviation determination, one of the tanks is tuned to a frequency above the predetermined desired frequency of 2400 cycles and the other tank is tuned to a frequency below the desired 2400 cycle frequency. The differences between the frequencies to which the tanks are tuned and the 2400 cycle desired frequency are, of course, equal or substantially equal since the system as hereinafter described is a null operating system.

Thus, for example, the tank 34 comprised of the transformer secondary 32 and a capacitor 36 might be tuned to approximately 2420 cycles while the tank 35 might be tuned to a frequency of about 2380 cycles. By these means if the input frequency is slightly above the desired 2400 cycles, the output of the tank 34 will be greater than the output of the tank 35, while if the input frequency is below 2400 cycles then the output of the tank 35 will be greater than the output of the tank 34.

Each tank is connected to a full wave rectifier bridge 38 and 39 respectively, and the output of these bridges, taken over leads 40—40 and 41—41 respectively, are respectively fed to a pair of opposing RC filter networks 42 and 43 respectively. The outputs of the bridges 38 and 39 are arranged in electrical opposition so that by opposingly connecting the RC filters 42 and 43, the output from the opposite ends of the filters will be a null output when the input from the alternator 17 of Figure 1 is properly at 2400 cycles, while it will have an amplitude and sign indicative of the direction and magnitude of the difference between the desired 2400 cycles and the actual frequency of the alternator 17, the error frequency.

The filter networks 42 and 43 are thus series interconnected and each includes a capacitor 44, 45 connected across the output of its respective rectifier bridge 38, 39. A resistance network is connected across the capacitor 44 for the filter 42 and includes a pair of series fixed resistors 46 and 47. Further, across the resistor 46 there is connected a temperature compensating resistance element 48 preferably having a negative temperature coefficient of resistance and may be such an element as a thermistor. Across the capacitor 45 of the filter 43 in parallel therewith, there is connected a resistor 49 in series with a potentiometer 50. The two filters are connected in series by an interconnection 51 joining the bottom of the filter 42 with the top of the filter 43. A lead 52 from the top of the filter 42 provides one outlet lead from the frequency discriminator while a lead 53 from the balancing potentiometer 50, and connected to the arm 54 thereof, provides the other outlet lead from the frequency discriminator 21. A resistor 55 may be interposed in the lead 53 to provide for a bias input into the system as well as for signal testing of the frequency discriminator since the potential thereacross will be a direct function of the output of the frequency discriminator. For both of these functions a pair of leads 56—56 are connected across the resistor 55.

The output of the frequency discriminator is then supplied to the control winding 57 of the magnetic amplifier 20 by connecting the leads 52 and 53 thereacross. By this connection directly to the control winding 57 of the magnetic amplifier, it is possible to control the magnetic amplifier by supplying a control signal over the leads 56 to the resistor 55 interposed in the line 53.

The form of magnetic amplifier 20 illustrated in Figure 2 of the drawings and included in this embodiment of this invention is a single ended type magnetic amplifier utilizing a pair of half wave reactors with a single control winding for the two reactors. The reactors 58 and 59 each include a power winding 60, 61 and a presetting or saturating winding 62, 63 respectively. These several windings are so connected and arranged in magnetic amplifier circuitry arrangement that the output therefrom, particularly from the power windings 60 and 61, is a function of the signal of the control winding 57 whereby the output from the magnetic amplifier is a function of the direction and amplitude of the frequency error in the input to the frequency discriminator 21. As stated hereinabove, each reactor is a half wave device. Accordingly, and for convenience of illustration, the paths therethrough have been illustrated by a long dashed line for the reactor 58 and the power winding 60, the long dashed lines being indicated generally by the numeral 64 while the path through the power winding 61 of the reactor 59 has been indicated generally by a short dashed line 65. Before tracing these, however, the general circuitry of the magnetic amplifier should be understood.

The input power through the magnetic amplifier is supplied over leads 66—66 from the 2400 cycle alternator 16 and a potentiometer 67 is connected thereacross in the magnetic amplifier circuit. The potentiometer 67 has an arm 68 which is adjustable to control the amount of current applied to the windings 62, 63. In particular, the windings 62, 63 are connected across a capacitor 69 and through a resistor 70 and a half-wave rectifier 71 to the arm 68. The resistor 70 and capacitor 69 thus form a filter.

The power windings 60 and 61 are serially interconnected with the center point connections therebetween also going to the aforesaid one side or one lead 66 from the power input. The other end of the power winding 60 is connected through a rectifier 72, a series capacitor 73, a series resistor 74, and another rectifier 75 to the other power lead 66. On the other hand, the other side or other end of the power winding 61 of the reactor 59 is connected through a rectifier 76, the resistor 74, the capacitor 73, and the series rectifier 77 to the other side or other lead 66 of the power supply.

Thus, the half wave circuit for the power winding 60 of the reactor 58 is from said other lead 66 through the rectifier 75, the resistor 74 the capacitor 73, the rectifier 72, and the power winding 60 back to the first power lead 66, this in indicated by the long dashed line 64. The direction for the power winding 61 is from the first lead 66 through the power winding 61, the rectifier 76, the resistor 74, the capacitor 73, the rectifier 77 back to the other power lead 66 as indicated by the short dashed line 65 and the arrow marked thereon. The capacitor 73 and the resistor 74 are operative as an output series filter.

Negative or inverse feedback is obtained by connecting the junction between rectifiers 72 and 77 to one terminal of the central winding 57 through a lead 78 and by connecting the other terminal of the central winding 57 to the junction between rectifiers 75 and 76 through a lead 79, a resistor 80 and a lead 81. Thus a fraction of the output voltage is applied to the control winding and the phase of the connection is such that negative, inverse or degenerative feedback is obtained to obtain the advantages incident thereto. The output from the magnetic amplifier is taken over leads 82—82 which are connected across the capacitor 73 and then lead back to the parasitic load alternator 16. These leads 82 and 83 comprise the energization leads for the field winding of the alternator 16 to control the output potential therefrom as described hereinabove for controlling the speed of the entire network and power generating system.

For purposes of ground testing the entire system, the present invention includes in the control system a ground test circuit arrangement operable to permit pneumatic excitation of the turbine whereby the control regulation effected by the system thus far described is permitted on the ground before take off without adding heavily to the system. For this purpose, there is provided a ground testing and also a starting network indicated generally at 90 in Figure 1. This network 90 is equipped to be energized from a ground power source such as a single phase of 115 volt A.C. supply fed thereto over lines 91 and 92. The line 92, for present purposes is a ground line as indicated at 93 while the line 91 is the power line. In series with the power line 91 is a single pole single throw stop switch 94 which is serially connected to one side of a single pole single throw start switch 95. The other side of the single pole start switch 95 is connected to a starting relay 96 on one side thereof, the other side of the relay 96 being connected to the ground line 92. Upon energization of the starting relay 96 through closure of the switch 95, the relay contacts 97 and 98 will be closed. The relay contacts 97 are connected across the start switch 95 and are effective as a holding contact so that the start switch 95 may be a mere momentary contact type switch. The contacts 98, however, are connected in series with a solenoid operator 99 for a valve having one end thereof connected as at 100 to a source of pneumatic energy while the other end thereof is connected through a pipe or tube 101 to a pneumatic or auxiliary input on the turbine 14. This will permit flow of pressurized air to the turbine 14 to drive the same and thereby permit testing etc. of the power supply and generating unit 10. To determine the effectiveness of the control a volt meter 102 is connected to the output from the parasitic load generator 16 between the parasitic load generator 16 and the parasitic load 23.

Should the unit so overspeed and be overdriven by the pneumatic energization of the turbine 14, the system will automatically cut-out and be stopped and the valve 103 operated by solenoid 99 will be closed since the solenoid 99 will be deenergized. For this purpose, one of the power leads of the main power alternator 15 is connected to energize a relay 104 through a capacitor 105, the bottom end of the relay 104 being grounded as at 106. The characteristics of the capacitor 105 and the relay 104 are matched with the alternator 15 so that upon appreciable overspeed the relay 104 will be energized to thereby open the mechanical latch type single pole single throw switch 107 in series with the power line 91. To reset the mechanical latch type safety overspeed switch 107, the system 90 is provided with a reset relay 108 between the ground line 92 and the power lead 91 through a series momentary contact type single pole single throw switch 109.

The switch 107 comprises a contact element 107a having an arm portion 107b engaged by a latch element 107c having a shoulder 107d. Spring 107e connects the elements 107a and 107b in a manner to urge the contact element 107a to an open position and at the same time to urge latch element 107c toward the arm portion 107b. When relay 108 is energized, it pulls the contact element 107a downward to its closed position while the arm portion 107b is moved beyond shoulder 107d. The latch element 107c then prevents return movement of contact element 107a until the latch element 107c is moved upwardly by energization of relay 104.

Once the system has been tested and found to be in proper operating condition, the crafts carrying the power generating system being indicated most schematically by the dash broken line 110 extending across Figure 1, the craft may be put into flight by its normal starting system. However, at the same time the craft is put into flight the power generating system 10 should also be put into operation and for this purpose the system of the instant invention includes a starter circuit and control system. At this point it should be noted that a mode of starting the power generating system in operation in accordance with this invention is to provide the gas generator with a "squib" such as a solid propellant which operates as an igniter for the fuel when the fuel is permitted to flow through the valves 13 and as an initial gas generating fuel supply for bringing the alternators and turbine up to speed very quickly, as for example, within 0.5 second. Such a starting device is indicated at 111 in the gas generator 12, one end thereof being grounded as at 112. The other end thereof is connected through a lead 113 and a momentary contact type starting switch 114 to the power lead 91. By closing the ignition starting switch 141 the solid propellant or "squib" is fired and ignition of the system begins. A feedback of gas pressure to the valve 13 opens the valve and then permits the fuel to flow from the fuel tank 11 into the gas generator as controlled by the valve 13. The system then continues and flows through its normal operation as explained hereinabove.

As soon as the craft is put into flight, however, it is separated from the ground system or testing and starting system 90 and to permit such separation quick disconnect couplings 115—115 are provided between all of the electrical devices in the ground system 90 and the craft carried system 10 also, a quick disconnect pneumatic tube coupling 116 is provided in the line 101 to permit quick disconnection of the pneumatic system also by force of flight of movement of the craft carrying the system 10. This quick disconnect coupling 116 of the pneumatic system also is effective as a check valve and dust check for the turbine 14.

From the foregoing it will readily be observed that numerous variations and modifications may be effected without departing from the true spirit and scope of the novel concepts and principles of this invention. We, therefore, intend to cover all such modifications and variations as fall within the true spirit and scope of the novel concepts and principles of this invention.

We claim as our invention:

1. In a control system for an electrical generating system having a plurality of commonly driven alternators, the frequency of which is controlled by control of the load on the alternators, a frequency discriminator connected to one of the alternators to obtain an input signal therefrom, means in said frequency discriminator to develop an output therefrom having a sign and amplitude indicative of the direction and amplitude of any difference between the frequency of said one alternator and a predetermined frequency therefor, a magnetic amplifier connected to said means in said frequency discriminator to be controlled by the output therefrom, a second of said alternators having a field winding connected to be energized from said magnetic amplifier whereby the output from the second alternator is a function of any frequency error, and a load on said second alternator supplied by the variable output of said second alternator to variably control the speed of the power generating system.

2. In a control system for an electrical power generating system having a plurality of commonly driven alternators, the frequency of which is controlled by control of the load on the alternators, a frequency discriminator connected to one of the alternators to obtain an input signal therefrom, means in said frequency discriminator to develop an output therefrom having a sign and amplitude indicative of the direction and amplitude of any difference between the frequency of said one alternator and a predetermined frequency therefor, a magnetic amplifier connected to said means in said frequency discriminator to be controlled by the output therefrom, said magnetic amplifier also being connected to said one of said alternators to be energized therefrom, a second of said alternators having a field winding connected to be energized from said magnetic amplifier and said means in said frequency discriminator whereby the output from the second alternator is a function of any frequency error and is controlled by the output of the means in the frequency discriminator and the magnetic amplifier, and a load on said second alternator supplied by the variable output of said second alternator to variably control the speed of the power generating system and maintain the frequency thereof substantially constant.

3. In a control system for an electrical generating system having a plurality of commonly driven alternators, the frequency of which is controlled by control of the load on the alternators, a frequency discriminator connected to one of the alternators to obtain an input signal therefrom, means in said frequency discriminator to develop a first control signal which changes in magnitude in one direction as the frequency of said alternator changes in one direction, amplifier means connected to said means in said frequency discriminator to develop an output voltage in response to said first control signal, means developing a second control signal opposing the effect of said first control signal whereby said output voltage is reduced to substantially zero at a frequency dependent upon the magnitude of said second control signal, a second of said alternators having a field winding connected to said amplifier to be energized by said output voltage whereby the output from said second alternator is a function of frequency, and a load on said second alternator supplied by the variable output of said second alternator to variably control the speed of the power generating system.

References Cited in the file of this patent

UNITED STATES PATENTS

| | | |
|---|---|---|
| 824,439 | Richardson | June 26, 1906 |
| 825,914 | Leavitt | July 17, 1906 |
| 1,477,781 | Standerwick | Dec. 18, 1923 |
| 1,477,782 | Steinmetz | Dec. 18, 1923 |
| 1,524,562 | Kuyser | Jan. 27, 1925 |
| 1,709,590 | Myers | Apr. 16, 1929 |
| 1,825,526 | Kamada | Sept. 29, 1931 |
| 1,935,126 | Moore | Nov. 14, 1933 |
| 2,014,365 | Beckett et al. | Sept. 17, 1935 |
| 2,431,501 | Phillips | Nov. 25, 1947 |
| 2,679,160 | Welch | May 25, 1954 |
| 2,700,301 | Thomsen | Jan. 25, 1955 |
| 2,716,888 | Svenson | Sept. 6, 1955 |
| 2,775,865 | Welch et al. | Jan. 1, 1957 |